US008689117B1

(12) United States Patent
Vasilik et al.

(10) Patent No.: US 8,689,117 B1
(45) Date of Patent: Apr. 1, 2014

(54) WEBPAGES WITH CONDITIONAL CONTENT

(75) Inventors: Kenneth Eric Vasilik, Bellevue, WA (US); Kobi Reiter, Seattle, WA (US)

(73) Assignee: Google Inc., Mountain View, CA (US)

( * ) Notice: Subject to any disclaimer, the term of this patent is extended or adjusted under 35 U.S.C. 154(b) by 155 days.

(21) Appl. No.: 12/610,242

(22) Filed: Oct. 30, 2009

(51) Int. Cl.
*G06F 3/00* (2006.01)
*G06F 17/00* (2006.01)

(52) U.S. Cl.
USPC .......................................... 715/760; 715/229

(58) Field of Classification Search
USPC ....................................................... 715/760
See application file for complete search history.

(56) References Cited

U.S. PATENT DOCUMENTS

| | | | |
|---|---|---|---|
| 5,826,031 A | 10/1998 | Nielsen | |
| 5,870,559 A | 2/1999 | Leshem et al. | |
| 6,085,229 A * | 7/2000 | Newman et al. | 709/203 |
| 6,173,316 B1 * | 1/2001 | De Boor et al. | 709/218 |
| 6,405,222 B1 | 6/2002 | Kunzinger et al. | |
| 6,405,223 B1 | 6/2002 | Kelley et al. | |
| 6,605,120 B1 | 8/2003 | Fields et al. | |
| 6,625,803 B1 | 9/2003 | Massena et al. | |
| 6,721,922 B1 | 4/2004 | Walters et al. | |
| 6,826,594 B1 | 11/2004 | Pettersen | |
| 6,920,609 B1 | 7/2005 | Manber et al. | |
| 6,934,748 B1 | 8/2005 | Louviere et al. | |
| 7,028,001 B1 | 4/2006 | Muthuswamy et al. | |
| 7,031,932 B1 | 4/2006 | Lipsky et al. | |
| 7,039,599 B2 | 5/2006 | Merriman et al. | |
| 7,047,294 B2 | 5/2006 | Johnson et al. | |
| 7,047,318 B1 | 5/2006 | Svedloff | |
| 7,168,040 B2 | 1/2007 | Yamamoto et al. | |
| 7,194,683 B2 | 3/2007 | Hind et al. | |
| 7,370,036 B2 | 5/2008 | Vedula | |
| 7,523,087 B1 | 4/2009 | Agarwal et al. | |
| 7,594,189 B1 | 9/2009 | Walker et al. | |
| 7,747,602 B2 | 6/2010 | Sampson et al. | |
| 7,895,293 B1 | 2/2011 | Vasilik | |
| 7,895,514 B1 * | 2/2011 | Edmunds et al. | 715/234 |
| 2001/0014895 A1 * | 8/2001 | Sappal | 707/500 |
| 2002/0042738 A1 | 4/2002 | Srinivasan et al. | |
| 2002/0069255 A1 | 6/2002 | Dinovo | |

(Continued)

OTHER PUBLICATIONS

Yeeeev, JavaScript—controlling the insertion point for document. write, Stack Overflow, available at http://stackoverflow.com/questions/1536970/javascript-controlling-the-insertion-point-for-document-write (original post Oct. 8, 2009).*

(Continued)

*Primary Examiner* — Doon Chow
*Assistant Examiner* — Conrad Pack
(74) *Attorney, Agent, or Firm* — Fish & Richardson P.C.

(57) ABSTRACT

Systems and techniques for generating a markup language document that has content to be conditionally display are disclosed. The markup language document includes JavaScript code and one or more comment tags indicating that content between the one or more comment tags is not to be processed for display by a client computer. The markup language document further defines a variable to hold a value. When the variable is a first value, at least one of the comment tags is ignored as a comment tag such that the content between the comment tags is processed for display. When the variable is a second value, the one or more comment tags are processed normally, such that the content between the comment tags is not displayed.

26 Claims, 7 Drawing Sheets

(56) References Cited

U.S. PATENT DOCUMENTS

| | | | |
|---|---|---|---|
| 2002/0129064 A1 | 9/2002 | Guthrie | |
| 2002/0143495 A1 | 10/2002 | Roser | |
| 2002/0165940 A1 | 11/2002 | Kameoka et al. | |
| 2002/0188508 A1 | 12/2002 | Lee et al. | |
| 2003/0097374 A1 | 5/2003 | Himeno | |
| 2003/0131106 A1 | 7/2003 | Kasriel | |
| 2003/0163784 A1 | 8/2003 | Daniel et al. | |
| 2004/0019634 A1 | 1/2004 | Van Geldern et al. | |
| 2004/0107423 A1 | 6/2004 | Noda | |
| 2004/0123247 A1 | 6/2004 | Wachen et al. | |
| 2004/0168122 A1 | 8/2004 | Kobipalayam Murugaiyan | |
| 2005/0021397 A1 | 1/2005 | Cui et al. | |
| 2005/0034065 A1 | 2/2005 | Weight | |
| 2005/0071745 A1 | 3/2005 | Ehrich et al. | |
| 2005/0071755 A1 | 3/2005 | Harrington et al. | |
| 2005/0071757 A1 | 3/2005 | Ehrich et al. | |
| 2005/0160002 A1 | 7/2005 | Roetter et al. | |
| 2005/0268229 A1 | 12/2005 | Wessling et al. | |
| 2006/0031417 A1 | 2/2006 | Narin | |
| 2006/0036400 A1 | 2/2006 | Kasriel et al. | |
| 2006/0085731 A1 | 4/2006 | Cui et al. | |
| 2006/0162071 A1 | 7/2006 | Dixon et al. | |
| 2006/0173815 A1 | 8/2006 | Vedula | |
| 2006/0184638 A1 | 8/2006 | Chua et al. | |
| 2006/0218490 A1* | 9/2006 | Fink | 715/517 |
| 2006/0265400 A1 | 11/2006 | Fain et al. | |
| 2006/0271671 A1 | 11/2006 | Hansen | |
| 2006/0288328 A1 | 12/2006 | Cross et al. | |
| 2007/0061700 A1 | 3/2007 | Kothari et al. | |
| 2007/0100956 A1 | 5/2007 | Kumar | |
| 2007/0124192 A1 | 5/2007 | Moatti | |
| 2007/0124671 A1 | 5/2007 | Hackworth et al. | |
| 2007/0130510 A1 | 6/2007 | Dharamshi et al. | |
| 2007/0136255 A1 | 6/2007 | Rizzo et al. | |
| 2007/0143672 A1 | 6/2007 | Lipton et al. | |
| 2007/0150353 A1 | 6/2007 | Krassner et al. | |
| 2007/0214237 A1 | 9/2007 | Stibel et al. | |
| 2007/0271352 A1 | 11/2007 | Khopkar et al. | |
| 2007/0271392 A1* | 11/2007 | Khopkar et al. | 709/245 |
| 2007/0271501 A1 | 11/2007 | Vasilik | |
| 2007/0271511 A1 | 11/2007 | Khopkar et al. | |
| 2007/0276813 A1 | 11/2007 | Rosen | |
| 2007/0299985 A1 | 12/2007 | Craig et al. | |
| 2008/0028334 A1 | 1/2008 | De Mes | |
| 2008/0046415 A1 | 2/2008 | Henkin et al. | |
| 2008/0046507 A1 | 2/2008 | Westphal | |
| 2008/0092060 A1 | 4/2008 | Berg et al. | |
| 2008/0133722 A1 | 6/2008 | Ramasundaram et al. | |
| 2009/0006192 A1 | 1/2009 | Martinez et al. | |
| 2009/0030859 A1 | 1/2009 | Buchs et al. | |
| 2009/0030921 A1* | 1/2009 | Kadiyska et al. | 707/101 |
| 2009/0113282 A1 | 4/2009 | Schultz et al. | |
| 2009/0150253 A1 | 6/2009 | Williams et al. | |
| 2009/0204579 A1 | 8/2009 | Govani et al. | |
| 2009/0241015 A1 | 9/2009 | Bender et al. | |
| 2009/0300483 A1* | 12/2009 | Viet | 715/236 |
| 2010/0281389 A1 | 11/2010 | Hutchinson | |
| 2011/0213676 A1 | 9/2011 | Singh et al. | |
| 2012/0150662 A1 | 6/2012 | Hannon et al. | |

OTHER PUBLICATIONS

HTML Tutorial—Attributes, tizag.com, available at http://web.archive.org/web/20081007121302/http://tizag.com/htmlT/htmlattributes.php (archived Dec. 22, 2007).*

Writing HTML, 27b. JavaScript—Dynamic Content, Maricopa Center for Learning and Instruction (MCLI), available at http://web.archive.org/web/20081013220058/http://www.mcli.dist.maricopa.edu/tut/tut27b.html (archived Dec. 22, 2007).*

International Search Report and Written Opinion for International Application No. PCT/US2007/069496, mailed Feb. 2, 2009, 10 pages.

International Preliminary Report on Patentability for International Application No. PCT/US2007/069496, mailed Apr. 23, 2009, 8 pages.

Brain, "How Internet Cookies Work," [online] [retrieved on Apr. 26, 2000]; Retrieved from the Internet URL: http://computer.howstuffworks.com/cookie.htm, 2 pages.

"ProHTML ticker, Dynamic Drive," Archived Jan. 1, 2005, [online]; Retrieved from the Internet URL: http://www.dynamicdrive.com/dynamicindex2/prohtmlticker.htm, 2 pages.

Raggett et al., "HTML 4.01 Specification, W3C Recommendation," [online] [retrieved on Dec. 24, 1999]; Retrieved from the Internet URL: http://www.w3.org/TR/1999/REC-htm1401-19991224, 389 pages.

Snapshot from Apr. 27, 2006, Kefta's Dynamic Targeting Solution, "It's about creating a meaningful and relevant experience for your visitors", [online] Retrieved from the Internet URL: http://web.archive.org/web/20060427125859/www.kefta.com/overview/approach.html, 2 pages.

Snapshot from Apr. 27, 2006, Kefta—Dynamic Targeting—the next generation of website personalization, "At Kefta, we believe in delivering the best message at the best time", [online]. Retrieved from the Internet URL: http://web.archive.org/web/20060427132429/www.kefta.com/overview/index.html, 2 pages.

Snapshot from Apr. 24, 2006, Offermatica: General A/B Test Demo, "What is Offermatica?", [online] Retrieved from the Internet URL: http://web.archive.org/web/20060422201155/www.offermatica.com/demos/ab.html, 7 pages.

Snapshot from Apr. 24, 2006, Offermatica: Hosted A/B testing, multivariate testing, and landing page optimization tools, "What is Offermatica?", [online] Retrieved from the Internet URL: http://web.archive.org/web/20060422201114/www.offermatica.com/whatis-1.0.html, 2 pages.

Snapshot from Apr. 24, 2006, Offermatica: How it Works, [online]. Retrieved from the Internet URL: http://web.archive.org/web/20060428054148/www.offermatica.com/whatis-1.1.1.html, 1 page.

Snapshot from Apr. 28, 2006, Optimost: Improve conversion rates on any landing page, splash page, jump page, "Maximize Conversion Rates Increase Your Revenue", [online] Retrieved from the Internet URL: http://web.archive.org/web/20060425212837/www.optimost.com/, 1 page.

Snapshot from Apr. 23, 2006, Touch Clarity—Technology, "Control Groups", [online] Retrieved from the Internet URL: http://web.archive.org/web/20060503215906/www.touchclarity.com/technology/detail.php?id=78, 1 page.

Snapshot from Apr. 23, 2006, Touch Clarity—Technology, "Targeting Engine", [online] Retrieved from the Internet URL: http://web.archive.org/web/20060503215705/www.touchclarity.com/technology/detail.php?id=76, 1 page.

Snapshot from Apr. 23, 2006, Touch Clarity—Technology, "Implementation", [online]. Retrieved from the Internet URL: http://web.archive.org/web/20060503215833/www.touchclarity.com/technology/detail.php?id=80, 1 page.

Snapshot from Apr. 23, 2006, Touch Clarity—Technology, "Visitor Profiling", [online] Retrieved from the Internet URL: http://web.archive.org/web/20060503215758/www.touchclarity.com/technology/detail.php?id=77, 1 page.

DeGroot, "Onmouseover div swap gives flickering effect," webmaster-talk, Jan. 18, 2008, 3 pages.

JavaScript Kit, "Conditional Compilation of Jscript/ JavaScript in IE," 1997-2008, 2 pages.

Vasilik, "Advanced Experiment Techniques," Google Website Optimizer WOAC Summit '08, Nov. 11, 2008, 10 pages.

Freire et al., WebViews: "Accessing Personalized Web Content and Services," ACM 2001, pp. 576-586.

Han et al., "WebSplitter: A Unified XML Framework for Multi-Device Collaborative Web Browsing," ACM 2000, pp. 221-230.

Kefta—Solutions—Customer Acquisition [online] "Customer Acquisition—drive more customers with greater efficiency"—Snapshot from Oct. 29, 2005, [retrieved on Apr. 14, 2010]. Retrieved from the Internet: < URL: http://web.archive.org/web/20051029081141/www.kefta.com/optimization-solutions/customeracquisition.html>, 3 pages.

(56) References Cited

OTHER PUBLICATIONS

Ahuja et al; Perceived Disorientation: An Examination of a New Measure to Access Web Design Effectiveness; Interacting with Computers; Jan. 22, 2001; 14, 15-29.
Garofalakis et al; Web Site Optimization Using Page Popularity; IEEE; 1999; 22-29.
Jan et al; An Optimization Model for Web Content Adaption; Computer Networks; 2006; 50, 953-965.
Mulvenna et al; Personalization on the Net using Web Mining; ACM; Aug. 2000; 43, 8, 122-125.
Song et al; Learning Block Importance Models for Web Pages; ACM; 2004; 203-211.

* cited by examiner

WEBPAGES WITH CONDITIONAL CONTENT

TECHNICAL FIELD

This document relates to webpages that may be made to contain conditional content.

BACKGROUND

A markup language document such as a webpage—typically includes content that is displayed to a viewer of the document. Such content generally takes a familiar form, such as in hypertext markup language (HTML) and defines the various elements that will appear when a webpage is rendered on a computing device. The elements can include text, hyperlinks, images, animations, forms, and other such elements.

Under certain conditions, it may be desirable to display two or more different versions of a webpage to two or more different viewers. For example, one version can include content (e.g., text) that is not included in a second version.

SUMMARY

This document describes systems and techniques for generating a webpage that includes conditional content. For example, an author of a webpage may wish to measure the efficacy of two versions of a webpage, such as to decide whether or not the conditional content should be included in the webpage. Certain conditions may be triggered based on parameters that are associated with a particular user who is viewing the webpage, and determinations may be made so that particular content is shown to the user, and other content is not.

In general, in one aspect, a computer-implemented method for generating a markup language document is disclosed. The method includes generating a markup language document at a server. The markup language document includes JavaScript code and one or more comment tags indicating that content between the one or more comment tags is not to be processed for display by a client computer. The markup language document further defines a variable to hold a value. When the variable is a first value, at least one of the comment tags is ignored as a comment tag such that the content between the comment tags is processed for display. When the variable is a second value, the one or more comment tags are processed normally, such that the content between the comment tags is not displayed. The markup language document is transmitted to the client computer.

In general, in another aspect, a computer-readable storage device encoded with a computer program product is disclosed. The computer program product includes instructions that, when executed, perform operations including generating a markup language document. The markup language document includes JavaScript code and one or more comment tags indicating that content between the one or more comment tags is not to be processed for display by a client computer. The markup language document further defines a variable to hold a value. When the variable is a first value, at least one of the comment tags is ignored as a comment tag, such that the content between the comment tags is processed for display. When the variable is a second value, the one or more comment tags are processed normally, such that the content between the comment tags is not displayed. The markup language document is transmitted to the client computer.

In general, in another aspect, a system including a processor and a storage device coupled to the processor and configurable for storing instructions, which, when executed by the processor cause the processor to perform operations, is disclosed. The operations include generating a markup language document that includes JavaScript code and one or more comment tags indicating that content between the one or more comment tags is not to be processed for display by a client computer. The markup language document further defines a variable to hold a value. When the variable is a first value, at least one of the comment tags is ignored as a comment tag, such that the content between the comment tags is processed for display. When the variable is a second value, the one or more comment tags are processed normally, such that the content between the comment tags is not displayed. The markup language document is transmitted to the client computer.

Implementations of the method, computer-readable storage device and system can include one or more of the following features. The JavaScript code can define the variable to hold the value. When the variable is the first value, ignoring at least one of the comment tags as a comment tag can include disregarding the comment tag, even though the comment tag remains present in the markup language document. In other implementations, when the variable is the first value, ignoring at least one of the comment tags as a comment tag can include interpreting characters forming the comment tag as something other than a comment tag. For example, the markup language document can further include an attribute. Interpreting the characters forming the comment tag as something other than a comment tag can include interpreting the characters forming the comment tag as a value of the attribute, such that the comment tag is ignored as a comment tag.

When the variable has the first value and the content between the comment tags is processed, a first version of a webpage represented by the markup language document can be displayed by the client computer and when the variable has the second value, a second version of the webpage can be displayed by the client computer. The content between the comment tags can include conditional content that is conditionally displayed in a webpage represented by the markup language document depending on the value of the variable, where the conditional content is displayed if the variable is the first value. If the JavaScript code is not executed by the client computer, the conditional content can be hidden, i.e., not displayed in the webpage.

Generating the markup language document can further include generating a markup language document including code operable to determine the value of the variable. In some implementation, the code operable to determine the value of the variable bases the determination on a setting of the client computer. In other implementations, the code operable to determine the value of the variable comprises a random number generator. In other implementations, the code operable to determine the value of the variable includes a call to a universal resource identifier from which a value can be returned assigning a value to the variable. In yet other implementations, the code operable to determine the value of the variable includes a call to a universal resource identifier from which a function can be returned that can be executed to determine the value to the variable.

In general, in another aspect, a computer-readable storage device encoded with a computer program product, method and system is disclosed. A markup language document is received that includes JavaScript code and one or more comment tags indicating that content between the comment tags is not to be processed by a client computer. A value of a variable referenced in the markup language document is determined. When the variable is a first value, at least one of the comment tags to be ignored as a comment tag, such that the content between the comment tags is processed. When the variable is a second value, the one or more comment tags are processed normally. Content between the comment tags is processed if the variable has the first value.

Implementations of the computer-readable storage device can include one or more of the following features. The JavaScript code can define the variable to hold the value. When the variable is the first value, ignoring at least one of the comment tags as a comment tag can include disregarding the comment tag even though the comment tag remains present in the markup language document. In other implementations, when the variable is the first value, ignoring at least one of the comment tags as a comment tag can include interpreting characters forming the comment tag as something other than a comment tag. For example, the markup language document can further include an attribute. Interpreting the characters forming the comment tag as something other than a comment tag can include interpreting the characters forming the comment tag as a value of the attribute, such that the comment tag is ignored as a comment tag. The markup language document can further include code operable to determine the value of the variable.

The systems and techniques disclosed herein can include some or none of the following advantages. A webpage that includes conditional content generated according to the systems and techniques described can be rendered with the conditional content displayed or hidden without dependency on a particular type of browser, i.e., is browser-independent. The functionality used is found in most browsers and does not require the downloading of other code or add-ons (e.g., Flash). Javascript code can be used, which can be interpreted by a variety of browsers. As a fail-safe, if the Javascript code does not execute or an error is encountered, the conditional content can be hidden, i.e., the default can be to hide rather than display the content. A determination as to whether a condition has been satisfied, such that the conditional content is to be displayed, can be made dynamically, for example, each time the webpage is rendered.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1A:
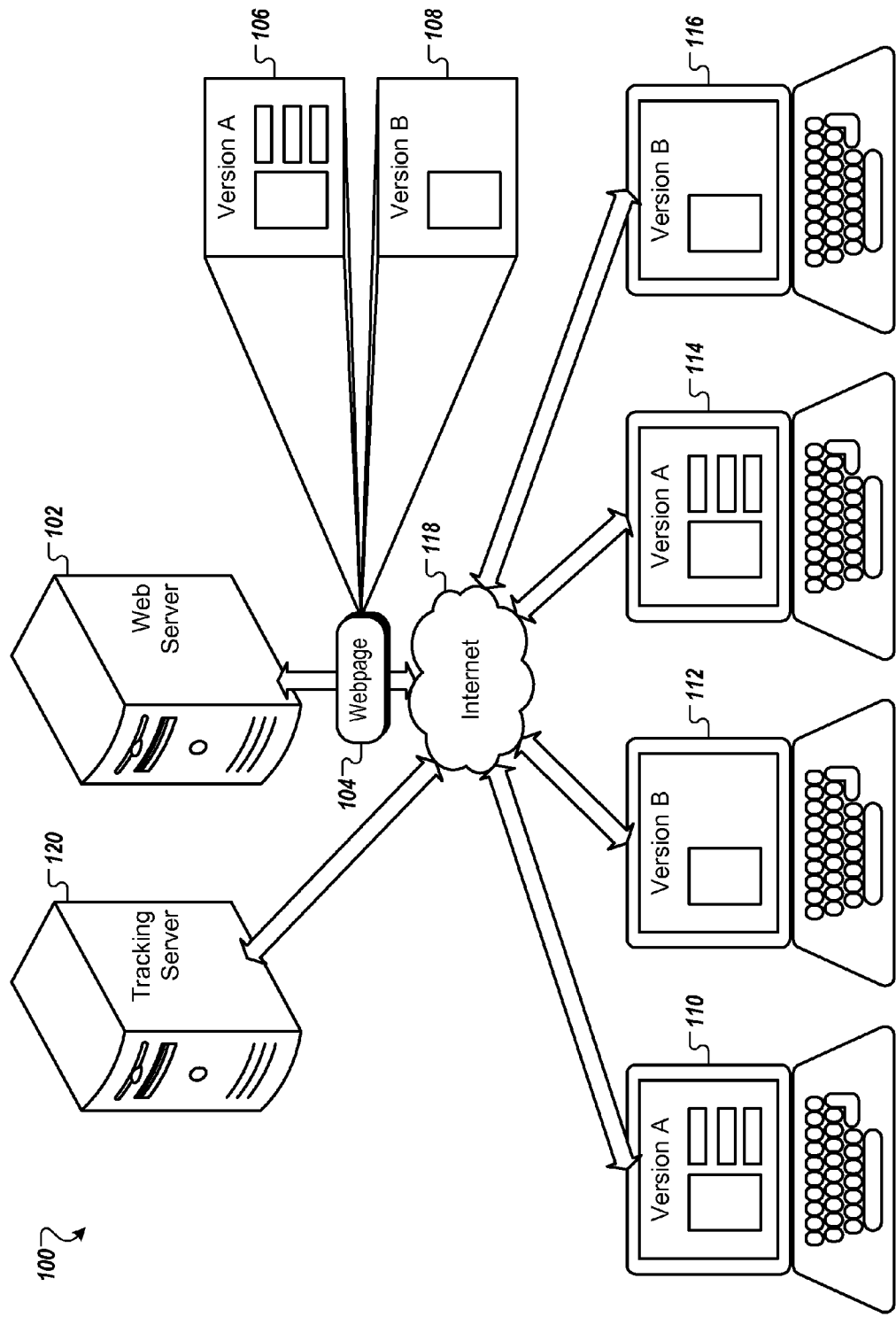
FIG. 1A is a conceptual diagram of an example system for generating a webpage including conditional content.

FIG. 1A is a conceptual diagram of an example system 100 for generating a markup language document, in this example webpage 104, that includes conditional content. A webpage that includes conditional content refers to a webpage that includes at least some portion of content that is displayed to a user who is viewing the webpage if a condition is satisfied, but not if the condition is not satisfied. In the example shown, a first version of the document (e.g., Version A 106) displays the conditional content, whereas a second version (e.g., Version B 108) hides (i.e., does not display) the conditional content.

Figure 1B:
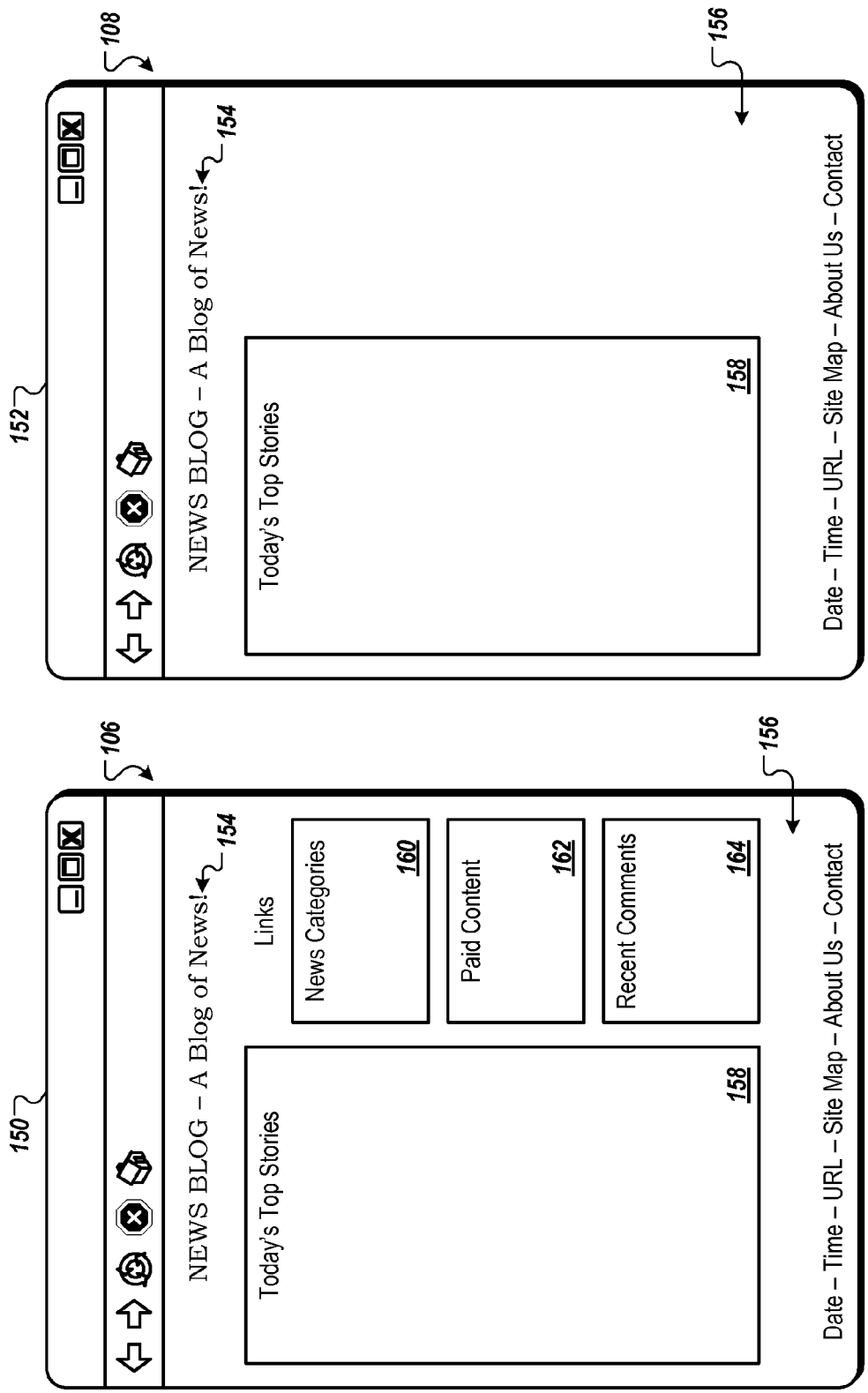
FIG. 1B show screen shots showing displays in example web browsers of alternative layouts of a webpage including conditional content.

Referring now to FIG. 1B, for illustrative purposes, schematic examples of Version A 106 and Version B 108 of the webpage 104 are shown displayed in example web browsers 150 and 152. In one implementation, both of the web browsers 150 and 152 can display the same non-conditional content as part of the webpage. In this example, the non-conditional content includes a header 154 with the webpage's title, a footer 156 with useful links, and a top stories section 158 that includes content about top current news items. The non-conditional content can be shown by the web browsers 150 and 152 without a verification of any conditions, i.e., display of this content is not subject to satisfying a condition.

By contrast, display of the conditional content is subject to satisfying a condition. In the example shown, if a condition is satisfied, then the web browser 150 displays, to the right of the top stories section 158, conditional content that includes a news categories section 160, a paid content section 162, and a recent comments section 164. Under different conditions, i.e., if the condition is not satisfied, then the web browser 152 does not display the conditional content.

Referring again to FIG. 1A, in the implementation of the example system 100 shown, the system 100 includes a web server 102 that is transmitting the webpage 104 over a network, e.g., the Internet 118, to various client computers 110-116. The web server 102 can create and/or store the webpage 104. The web server 102 can be a computer system that is capable of receiving requests for documents and of returning documents in response to the requests. The web server 102 can be a single server running on dedicated hardware, a virtual server sharing hardware with other computer systems, a portion or all of a distributed computer system, a personal computer, or other system.

The webpage 104 can be an electronic document that can include markup language and script language information, such as hypertext markup language (HTML) and references to JavaScript code. The webpage 104 can be configured such that, depending on the execution of some or all of the script language portion, the document can be rendered into different versions. For example, Version A 106 can display elements 160, 162 and 164 to the right of element 158, and Version B 108 can hide (i.e., not display) elements 160, 162 and 164.

Client computers 110-116 can communicate with the web server 102 through a network 118, such as the Internet. The client computers 110-116 can execute an application, such as a web browser, that is capable of displaying an electronic document that can include markup language and script language information, such as the webpage 104. Examples of the client computers 110-116 include personal computers, laptops, cellular phones, mobile computing device, personal data assistants, and/or other devices.

In various circumstances, it can be possible to display different versions of a webpage at different times and/or to different users. In one illustrative implementation, displaying two versions of a webpage may be desirable to track the conversion rate of two versions of a landing page as an experiment to determine the optimal landing page content and/or layout. Advertisers frequently include hyperlinks in their advertisements to pages in their respective web sites. These pages are called "landing pages." A landing page can be designed to request that a browsing user do something, and this request is called the "call to action." If an advertisement is for merchandise, the call to action might request that the browsing user buy the merchandise from an online store.

The call to action may not always be successful. One measure of success for online advertising is "conversion," which is measured by determining whether a browsing user reaches a "conversion page," which can be an ordinary webpage designated by the advertiser for tracking purposes. For example, a conversion page for an online store advertising a hat for sale might be a page for a virtual shopping cart with the hat in the shopping cart. Alternatively, the conversion page can be an order confirmation page that reflects that the hat was actually purchased. If the advertisement had been placed to generate sales leads, the conversion page might be the webpage that is shown after a browsing user submits contact information. If the advertisement had been placed to encourage people to download a movie trailer, the conversion page might be chosen to be the movie trailer download page. Several conversion pages can correspond to a landing page, if the advertiser believes that several possible outcomes correspond to success. For example, a web site for a movie may have several pages that provide movie trailers in different resolutions. More generally, several landing pages and conversion pages can correspond to each other.

Typically, the advertiser wants browsing users to reach the landing page from the advertisement, then reach the conversion page from the landing page. The percentage of browsing users who, having reached the landing page, then go on to reach the conversion page is called the "conversion rate." The design of the landing page, including the content included in the landing page, can influence the conversion rate. Low conversion rates can result from poorly designed landing pages and/or landing pages that do not conform to the subjective expectations of browsing users who selected the corresponding advertisements.

An advertiser can design an experiment to determine empirically which of two or more landing page designs has the best conversion rate. For example, the advertiser may want to compare an original landing page (Version A) with a landing page that has a different headline than the original, or a landing page that has a different image than the original (Version B). The advertiser may then conduct an experiment by running the same advertisement for both landing pages, so that some randomly or non-randomly selected group of visitors who select the advertisement see Version A and others see Version B. The advertiser then compares the conversion rates of the two landing pages to determine which is more effective. This technique of comparing actions in response to different webpages can be called an NB comparison, an NB test, or an NB experiment. Performing an NB test can require some statistical expertise on the part of the advertiser.

The example system shown, for illustrative purposes, can be used to implement an NB experiment. The optionally included tracking server 120 can be a computer system that is capable of tracking actions taken by other elements in the system 100. That is, the tracking server 120 is operable to track the conversion rates of Version A and Version B of the webpage 104. The tracking server 120 can be a single server running on dedicated hardware, a virtual server sharing hardware with other computer systems, a portion or all of a distributed computer system, a personal computer, or other system.

The client computers 110-116 can request the webpage 104 from the web server 102 via the network 118. Upon receiving the webpage 104, the client computers 110-116 can render the webpage. As part of the rendering process, script language information can be interpreted or compiled. Depending upon the result or failure of the rendering, the client computers 110-116 can display either the Version A 106 or the Version B 108 of the webpage 104. The tracking server 120 can communicate with the client computers 110-116 via the network 118 to determine which of the Versions 106 or 108 of the webpage 104 are displayed, and to track the conversion rate of the version that is displayed.

The webpage 104 can include JavaScript code and one or more comment tags, where the one or more comment tags indicate that content between the one or more comment tags is not to be processed for display by a client computer, e.g., client computers 110-116. The webpage 104 can further define a variable to hold a value. When the variable is a first value, at least one of the comment tags can be ignored as a comment tag, such that the content between the comment tags is processed for display. When the variable is a second value, the one or more comment tags can be processed normally, such that the content between the comment tags is not displayed.

In some implementations, ignoring at least one of the comment tags as a comment tag includes disregarding the comment tag, even though the comment tag remains present in the webpage.

In other implementations, ignoring at least one of the comment tags as a comment tag includes interpreting characters forming the comment tag as something other than a comment tag. By way of illustration (and without limitation), an example of the script language code that can be included in the webpage 104 to determine which of the Versions 106 or 108 to display is shown below in Table 1, implemented herein in JavaScript. When loaded into one of the client computers 110-116, the example here will display the conditional content, i.e., elements 160-164 (i.e., Version A 106) if the 'showit' variable is true, and will not show the conditional content (i.e., Version B) if the 'showit' variable is false.

TABLE 1

```
1   <html><body>
2   <script>
3   var showit = Math.random( ) > 0.5;
4   if (showit) document.write('</noscript a="')
5   </script><!--" >
6   <script>document.write('Links');</script>
7   <div><p>News categories</p><img src="images/news.gif" /></div>
8   <div>Today the number of patent applications submitted reached
    a staggering one million applications.</div>
9   <iframe src="linktonewsstory.html"></iframe>
10  <div><p>Paid Content</p><img src="images/paidContent.gif"
    /></div>
11  <div>Click here to sign up for patent application
    classes.</div>
12  <iframe src="linktoclasses.html"></iframe>
13  <div><p>Recent Comments</p><img src="images/comments.gif"
    /></div>
14  <div>Some Recent Comments by our Readers.</div>
15  <iframe src="comments.html"></iframe>
16  <script>document.write('<'+'!'+'-'+'-')</script> -->
17  </body></html>
```

The example code shown in Table 1 can be included in a markup language document, such as in the code that defines a webpage and is sent by a web server to a web browser. The code includes one or more HTML comment tags that indicate that content between the comment tags is not to be processed by a client computer, e.g., a browser executing on the client computer. The code further includes a variable, i.e., the variable showit, that has a value. A first value for the variable, e.g., the value "true", causes at least one of the comment tags to be eliminated as a comment tag, which is described further below, such that the content between the comment tags is executed. A second value for the variable, e.g., the value "false", causes the one or more comment tags to be processed normally.

For discussion purposes, the lines of code are numbered 1-17. The conditional content, i.e., the "Links" title and elements 160, 162 and 164, is represented in the code at lines 6, 7-9, 10-12 and 13-15, respectively. The value of the 'showit' variable can, in part or in whole, determine if comments are applied to the lines of code that represent the title and elements 160, 162 and 164 (i.e., lines 6-15), and therefore which of the Versions 106 or 108 of the webpage 104 are displayed. The "Links" title at line 4 is a JavaScript command. The conditional content at lines 7-15 is HTML code.

If the value of "showit" is false, then some of the code at line 4, i.e., "document.write ('</noscript a='")", does not execute. If the document.write command at line 4 does not execute, then the conditional content is not displayed because the code lines 6-15 are positioned between the comment begin tag <!-- and the comment end tag -->. Text that is included between a comment begin tag and a comment end tag is ignored by the browser's rendering engine and not rendered.

If the value of "showit" is true, then all of the code at line 4 executes when the webpage is rendered. In JavaScript code, when "document.write" code executes, the text that follows "document.write" in the mark up document is injected immediately following the subsequent </script> tag. Therefore, in this example, the code '</noscript a='" is injected immediately after the </script> tag in line 5 and before the comment begin tag <!--. The attribute "a" trumps the comment begin tag, in that a parser interprets the value of attribute "a" as being <!--. The comment begin tag is therefore effectively consumed as the value of the attribute "a", and will no longer be seen by the browser as a comment begin tag. That is, the characters forming the comment begin tag, i.e., <!--, are interpreted as something other than a comment begin tag, and in this example, are interpreted as the value of the attribute "a". With the comment begin tag consumed, the code at lines 6-15 is therefore rendered by the browser's rendering engine and the conditional content represented by this code, i.e., elements 160, 162 and 164, is displayed.

In the example described above, the /noscript tag not only is effective to consume the comment begin tag, but is, itself, innocuous to rendering the webpage, in that the tag is an ending noscript tag. It should be understood that the /noscript tag is but one example, and there are other tags that can be used for this purpose. For example, the /span tag, which does not affect the display or behavior of the page, can be used.

Optionally, a second "document.write" line of code can be included in the mark up document. The comment end tag --> at line 16 will be displayed as text on the rendered webpage when the "showit" variable is true, because the comment begin tag is ignored in such a situation. To avoid having the --> displayed, the second document.write can be included at line 16, such that immediately following the </script> tag (also included in line 16), the characters "<!--" are injected, i.e., a second comment begin tag. The second comment begin tag is injected immediately before the comment end tag, therefore creating an empty comment. The browser will therefore interpret the --> at line 16 as a comment end tag corresponding to the second comment begin tag, and the --> will therefore not be displayed as text on the webpage. In other implementations, the --> can be displayed, e.g., in a color selected to blend in with a background color of the rendered webpage, and therefore be invisible to a user of the webpage.

By way of illustration (and without limitation), another example of the script language code that can be included in the webpage 104 to determine which of the Versions 106 or 108 to display is shown below in Table 2, implemented herein in JavaScript. In this example, the /noscript attribute (a) is not surrounded with quotes. The attribute consumes the comment begin tag as the value for "a" and the > character terminates the /noscript tag. In this example, the comment end tag is also consumed by the attribute (a). At line 15, a second /noscript tag for the attribute (a) is included, which in this case consumes the comment end tag as the value for "a", so that the comment end tag is not displayed on the webpage.

TABLE 2

```
1   <html><body>
2   <script>
3   var showit = Math.random( ) > 0.5;
4   if (showit) document.write('</noscript a=')</script><!-- >
5   <script>document.write('Links');</script>
6   <div><p>News categories</p><img src="images/news.gif" /></div>
7   <div>Today the number of patent applications submitted reached
    a staggering one million applications.</div>
8   <iframe src="linktonewsstory.html"></iframe>
9   <div><p>Paid Content</p><img src="images/paidContent.gif"
    /></div>
10  <div>Click here to sign up for patent application
    classes.</div>
11  <iframe src="linktoclasses.html"></iframe>
12  <div><p>Recent Comments</p><img src="images/comments.gif"
    /></div>
13  <div>Some Recent Comments by our Readers.</div>
14  <iframe src="comments.html"></iframe>
15  </noscript a= -->
16  </body></html>
```

In the example in Table 2, the lines 1-3, 5-14, and 16 are the same as the lines 1-3, 6-15, and 17 in the example in Table 1. The conditional content, i.e., the "Links" title and elements 160, 162 and 164, is represented in the code at lines 3, 4-6, 7-9, and 10-12 respectively.

In the examples in Table 1 and 2, the "showit" variable value is based on a random, pseudo-random, or effectively random number. In this example, if the variable value has an even distribution, a large number of the client computers 110-116 can display the version 106 and 108 in an equal or nearly equal proportion.

In other implementations, the "showit" variable can be determined with different code, e.g., to accomplish different goals. Table 3 shows alternative example code statements, although it should be understood that Table 3 is not exhaustive and other examples for determining the value of the "showit" variable are possible.

TABLE 3

| | |
|---|---|
| var showit = 1; | Always show conditional content |
| var showit = 0; | Never show conditional content |
| var showit = document.cookie.indexOf ("my_Cookie=Moo"); | Show conditional content if a cookie contains a certain string |
| var showit = document.location.href == http://www.mysite.com; | Show conditional content if the webpage is generated for a given domain |

TABLE 3-continued

| | |
|---|---|
| var showit = (document.cookie.indexOf ("my_Cookie=Moo") && document.location.href == http://www.mysite.com) | Show conditional content if a cookie contains a certain string and if the webpage is generated for a given domain |
| <script src="http://www.anotherserver.com/showit.js"></script> <script>var showit = function_defined_by_showit_js_file( ); </script> | Contact another web server synchronously and ask if the conditional content should be shown |

In the example shown in Table 1, the code 'fail safe' defaults to the condition of not displaying the conditional content. For example, if a browser is not JavaScript-enabled or some other error occurs, the code lines 6-15 remains positioned between a comment begin tag and a comment end tag, and are therefore not processed to display the corresponding content.

The example discussed above is relatively simple for illustrative purposes. However, it should be understood that in other implementations, there can be two or more items of conditional content included in a webpage. The "showit" variable can have more than two values (i.e., more than a true and a false value). For example, the "showit" variable can have values 0, 1, 2, . . . N, where the value of the variable controls which item of conditional content is displayed. That is, for example, a non-zero value can cause an item that would otherwise be hidden to be displayed, and a zero value can cause a default item of content to be displayed. In some implementations, using 0 to N values can allow for N+1 variations of content for a given webpage.

In implementations in which the conversion rates of Versions A and B of the webpage are being tracked for experimental purposes, or otherwise, the client computers 110-116 can report information to the tracking server 120. For example, if the client computer 112 displays Version A 106 of a landing page, and a user selects a particular content, e.g., a link to a conversion page, then this user-selection can be reported to the tracking server 120. Such reporting may be conducted by having the link point to a server that tracks the number of clicks and causes the user's browser to redirect to a landing page. The reporting may also be performed by tracking the number of times each landing page is accessed in general, particularly where the only simple way to reach the relevant landing pages is via the page that has conditional content display.

In this way, the tracking server 120 can compile statistics related to the conversion rate of the Versions A 106 and B 108 from the client computers 110-116. Such statistics may be used where the two versions of a webpage are similar, and an administrator wants to determine which version generates the best user response (e.g., as measure by click through rates, conversion rates from ads, and the like). The administrator may then make a decision on which version of the content to use with the page on a go-ahead basis. Such a process may also be automated, by which a user can identify alternative content, and code for presenting the alternatives may be generated automatically. A system may then track interaction with the alternative content for a determined time period before determining automatically which version has the best response, and may then automatically alter the code so that only the content that generates the best response is displayed to users.

Figure 2:
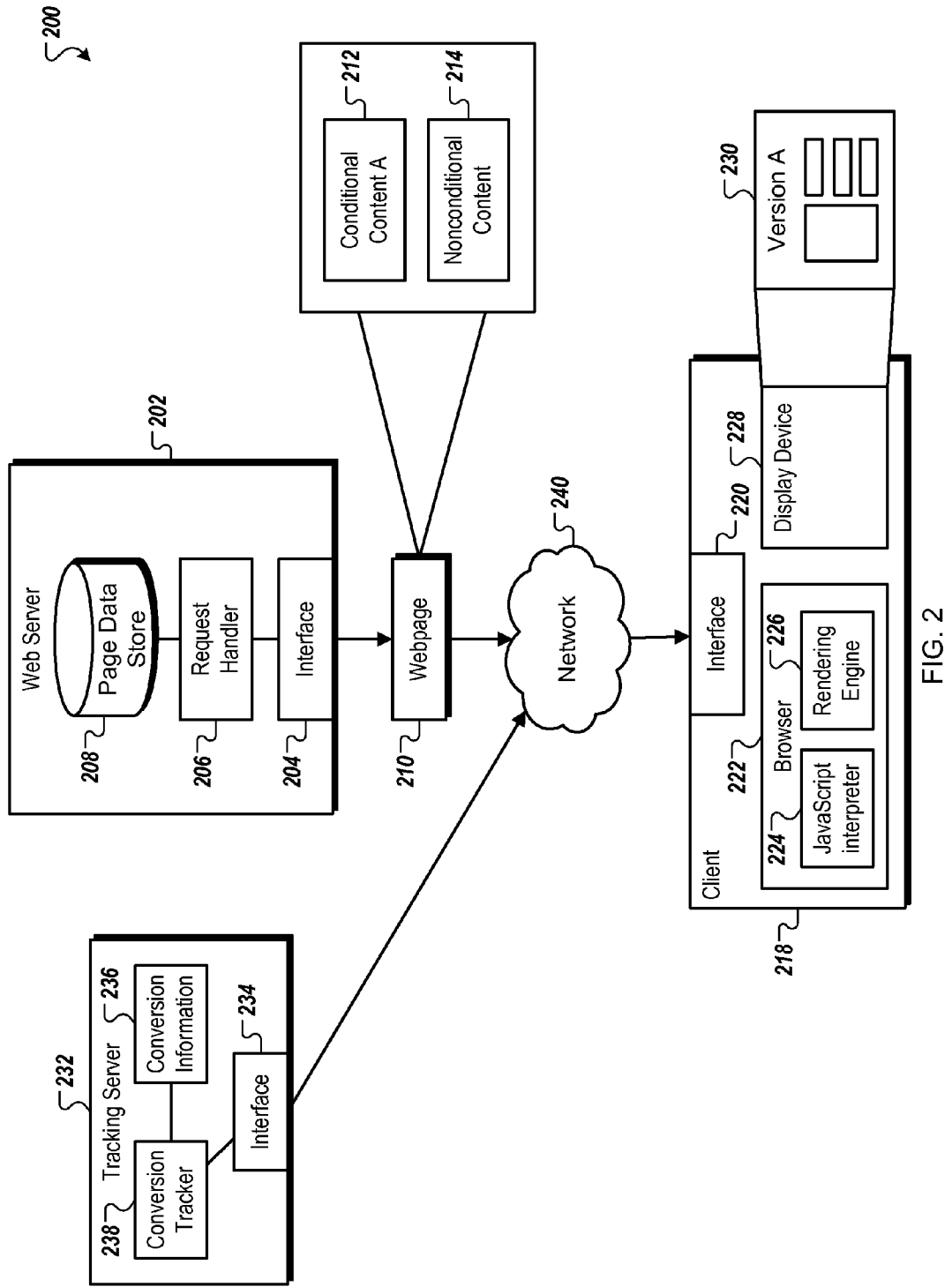
FIG. 2 is a block diagram of an example system for displaying a webpage including conditional content.

FIG. 2 is a block diagram of an example system 200 for generating and displaying a webpage including conditional content. The system 200 includes a web server 202 that hosts a webpage 210, a client 218, and a tracking server 232 that can track the display of the webpage 210.

In one implementation, the web server 202 can be a computer system that stores and serves documents. An interface 204 can be software and/or hardware of the web server 202 that receives messages sent to the web server 202 and transmits messages from the web server 202. A request handler 206 can be a software application or module that can examine messages sent to the web server 202 and create responses to the requests. A page data store 208 can be software and/or hardware, such as a database, that includes webpages such as the webpage 210.

The webpage 210 can be a markup language document, e.g., an HTML document, that includes a conditional content 212 and nonconditional content 214. The conditional content A 212 can be one or more markup language objects that can be optionally displayed or ignored by a web browser that renders the webpage 210. The nonconditional content 214 can be markup language objects that are indicated to always be displayed by a web browser that renders the webpage 210.

The client 218 can be a computer system capable of executing software and communicating with other computer systems. An interface 220 can be software and/or hardware of the client 218 that receives messages sent to the client 218 and transmits messages from the client 218. A browser 222 can be a web browser or other application capable of rendering a webpage including conditional content into a visual representation. A JavaScript interpreter 224 can execute script in a webpage including conditional content. A rendering engine 226 can create visual objects based on a webpage including conditional content and the output of the JavaScript interpreter 224. A display device 228 can be a monitor, projector, or other output system that can display a rendered webpage including conditional content. A version A 230 can be a rendered representation of a webpage including the conditional content A 212 and the nonconditional content 214.

In the implementation shown, the optional tracking server 232 is included, e.g., to track the conversion rate for two versions of a landing page. As discussed above, the system can be implemented without the tracking server. The tracking server 232 can be a computer system that tracks events or the behavior of systems in the system 200. An interface 234 can be software and/or hardware of the tracking server 232 that receives messages sent to the tracking server 232 and transmits messages from the tracking server 232. Conversion information 236 can be information about conversion pages, that can be displayed, for example, by the client 218, and the display thereof tracked by the tracking server 232. In some implementations, the tracking server 232 can track the display of a landing page, such as the webpage 210, and the display of a conversion page reference in the conversion information 236. Conversion rates for the landing page 210 can be calculated by the tracking server.

A network 240 can receive and transmit messages to and from elements of the system 200. Example messages include webpage requests and webpages such as the webpage 210. One example of the network 240 is the Internet.

The browser 222 can generate a request for the webpage 210 and send the request for the webpage 210 to the interface 220. The interface 220 can send the request for the webpage 210, via the network 240, to the interface 204. The interface 204 can send the request for the webpage 210 to the request handler 206. The request handler 206 can process the request, in part by fetching the webpage 210 from the page data store 208 and returning the webpage 210 to the interface 204. The interface 204 can return the webpage 210, via the network 240, to the interface 220. The interface 220 can return the webpage to the browser 222. Upon receipt of the webpage 210 by the browser 222, the JavaScript interpreter 224 can interpret or execute script language data, such as JavaScript, in the webpage and the rendering engine 226 can render the webpage 210, for example using the results of the JavaScript interpreter's 224 interpretation or execution.

As a part of the JavaScript interpreter's 224 interpretation or execution of the webpage 210, the conditional content A 212 can be unmarked as a comment depending on the value of a variable (e.g., "showit") included in the webpage 210, as described above in reference to the example code shown in Table 1. If the conditional content A 212 is unmarked as a comment, i.e., an HTML comment begin tag is eliminated based on the value of the variable, then the display device 228 displays Version A 230 of the webpage, which version includes the conditional content. Otherwise, a Version B is displayed that does not include the conditional content.

In some implementations, the Version A 230 can be a landing page. In these implementations, the JavaScript interpreter 224 can send a message to the tracking server 232 detailing the display of the Version A 230. The JavaScript interpreter can create a message that includes a description of the Version A 230 and send the message to the interface 220. The interface 220 can send the message, via the network 240, to the interface 234. The interface 234 can send the message to the conversion tracker 238. The conversion tracker 238 can examine the message and track information about the display of the Version A 230. After the display of the Version A 230, a user can browse to other pages, such as a conversion page. In these implementations, the JavaScript interpreter 224 can send a message to the tracking server 232 detailing the navigation to the tracking page. This second message can be sent from the JavaScript interpreter 224 to the conversion tracker 238 using the steps described above.

In some implementations, the JavaScript interpreter 224 can fail to execute or interpret the script language data of the webpage 210. In these implementations, the conditional content A 212 by default is marked as a comment and ignored by the rendering engine 226.

Figure 3A:
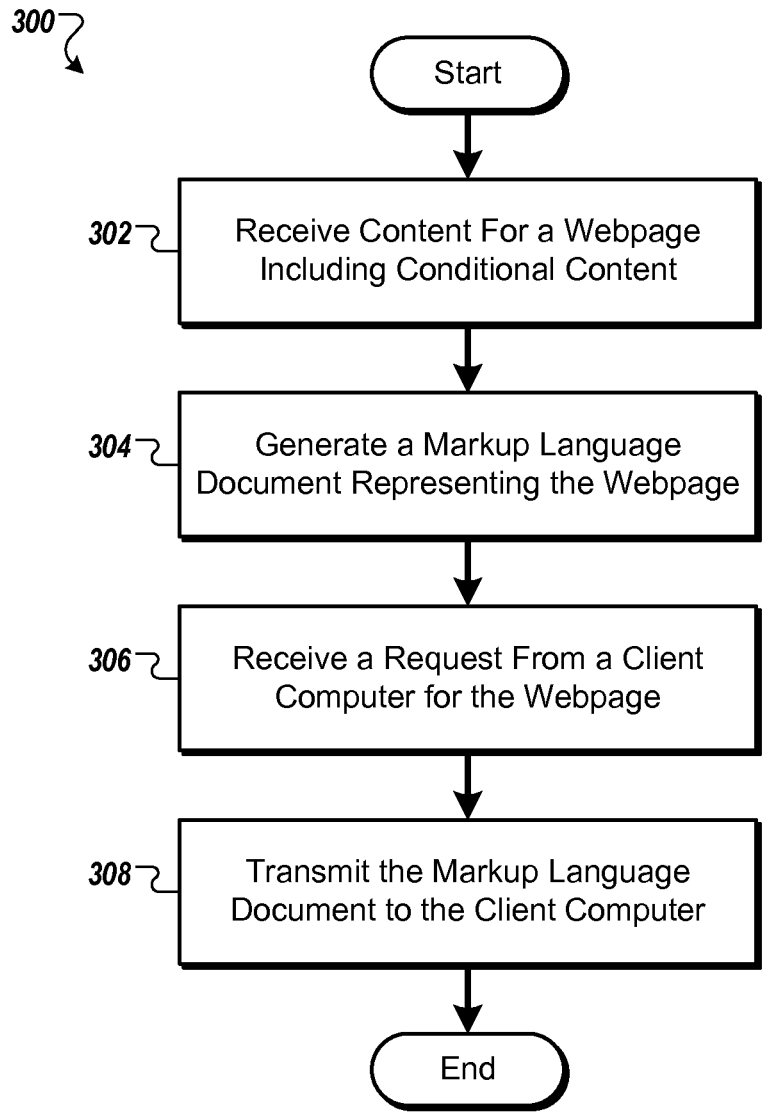
FIG. 3A is a flow chart of an example process for creating and serving a webpage including conditional content.

FIG. 3A is a flow chart of an example process 300 for creating and serving a webpage including conditional content. In some implementations, the process 300 can be performed by a computer system, e.g., the web server 202.

Content for a webpage including conditional content can be received (Step 302). In one implementation, a new and untested webpage can be developed that includes separate display elements. Different layout schemes of the display elements can be more or less aesthetically pleasing, easier or harder to navigate, or more or less likely to attract attention to a particular display element. Marking some or all of the display elements as conditional content can allow the display elements to appear or not appear in different layout schemes.

The markup language document, i.e., the webpage, is generated (Step 304). In some implementations, the webpage can include multiple copies of data objects, such as display elements, that are ignored in certain conditions. For example, two identical display elements (in different positions on a visual display of the webpage) can be associated with conditions that are mutually exclusive, and thus only one of the two identical display elements will be shown.

For example, a webpage created, such as the webpage 104, can include conditional content, such as that shown in FIG. 2. When rendered, the webpage can have two layouts, such as shown in the web browsers 150 and 152.

A request is received from a client computer for the webpage (Step 306). In some implementations, a web server can receive a Hypertext Transfer Protocol (HTTP) message such as a 'GET' request specifying a webpage that includes conditional content. In an alternative implementation, a data server can receive a file transfer protocol (FTP) command such as 'RETR' command to retrieve a file.

The webpage including conditional content is transmitted to the client computer (Step 308). In some implementations, a web server can reply to a HTTP request for a webpage including conditional content by creating and replying with a copy of the webpage including conditional content from a computer readable medium. In other implementations, the data server can send a file to a computer executing an FTP client.

A particular order, number, and type of steps are described here for the process 300. However, it will be appreciated that the order, number, and type of steps required for the process 300 can be different in other implementations.

Figure 3B:
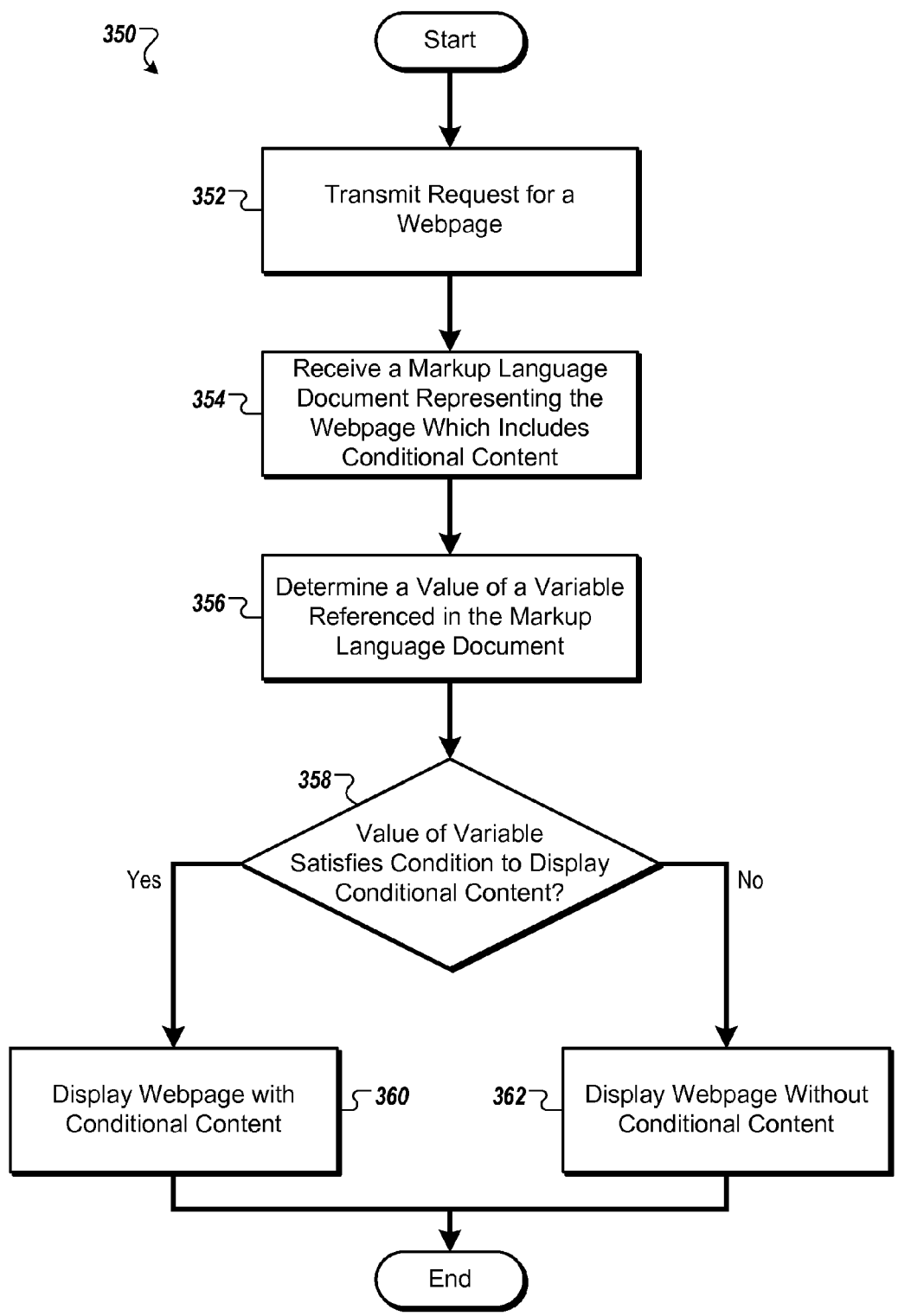
FIG. 3B is a flow chart of an example process for receiving and displaying a webpage including conditional content.

FIG. 3B is a flow chart of an example process 350 for receiving and displaying a webpage including conditional content. In some implementations, the process 350 can be performed by a computer system, e.g., the client 218.

A request for a webpage can be transmitted (Step 352). In some implementations, a computer executing a web browser can generate a HTTP message such as a 'GET' request specifying a webpage including conditional content.

A markup language document, i.e., the webpage, including conditional content can be received (Step 354). In some implementations, a computer can receive a document in response to an action such as the step 352. The document can include conditional content to be displayed/hidden based on the evaluation of a conditional expression within the document.

A value of a variable or variable reference in the webpage can be determined (Step 356). In some implementations, a computer rendering a webpage including conditional content can assign a value to the variable. For example, the value assigned to the variable can be determined by an expression or function in the code included in the webpage as was further described above in reference to Tables 1 and 2. In some examples, the expression or function can use system settings, screen resolution, or a random number generator in determining the value. In other examples, the expression or function use a value referenced by the webpage including conditional content. For example, the expression or function can include a call to a universal resource identifier (URI). The information returned by the URI can be a value that can be directly assigned to the variable, a function that can be executed by the client to produce a value, or other information. Table 1 and Table 3 discussed above show various illustrative code examples for determining the variable value, although other techniques can be used.

The value of the variable can be used to determine if conditions are satisfied to display conditional content (Step 358). In one implementation, a Boolean variable that is true, an integer variable set to a positive value and/or a string variable set to "true" satisfies the condition to display the conditional content. In some implementations, a set of variables in which some or all variables individually satisfy one condition to display conditional content can indicate satisfactions of conditions to display conditional content.

If the value of the variable is such that a condition is satisfied to display conditional content ("Yes" branch of decision Step 358), then the webpage can be displayed with the conditional content (Step 360). In some implementations, a web browser can render the webpage including conditional content into an audio and/or visual representation of the webpage including the conditional content, for example, as shown at 150 in FIG. 1B. If the value of the variable is such that a condition is not satisfied to display conditional content ("No" branch of decision Step 358), then the webpage can be displayed without the conditional content (Step 362).

A particular order, number, and type of steps are described here for the process 350. However, it will be appreciated that the order, number, and type of steps required for the process 350 can be different in other implementations. In some implementations, a document can include multiple conditional content objects with different display conditions. In this implementation, the Step 358 and either the Step 360 or the Step 362 can be repeated for each conditional content objects.

Figure 4:
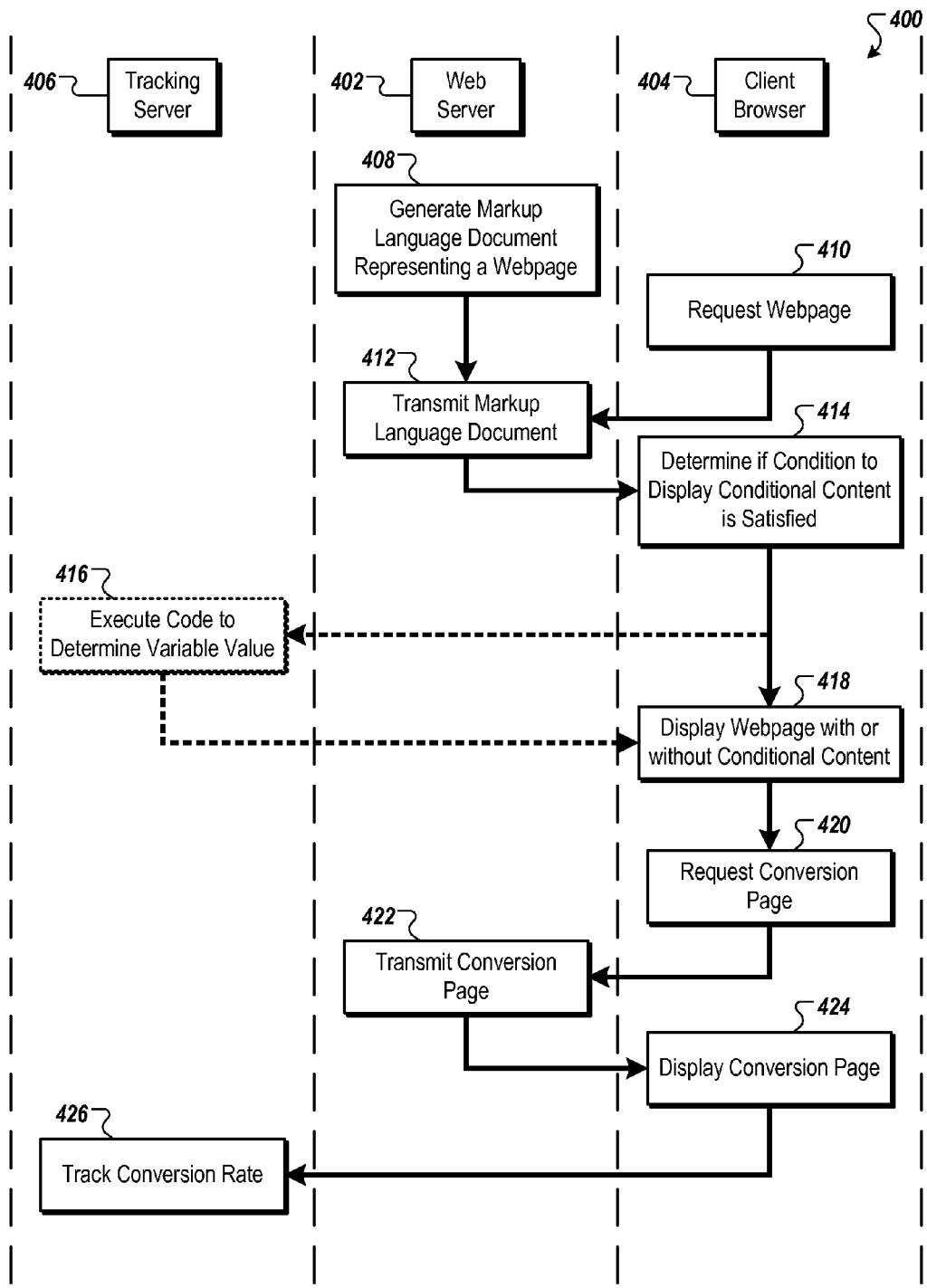
FIG. 4 is a swim lane diagram of an example process for serving, displaying, and tracking a webpage including conditional content.

FIG. 4 is a swim lane diagram of an example process 400 for serving, displaying, and tracking a webpage including conditional content. In a some implementations, a web server 402 can include a collection of virtual data servers that store and server webpages. The web server 402 can include a load balancing server that distributes requests for webpages to equalize the computational load between the virtual data servers. A client browser 404 can be an application executing on a computer or a mobile computing device, such as a cellular telephone. The client browser can implement the HTTP protocol to request and receive webpages and can render webpages that include JavaScript and conditional components. A tracking server 406 can track the conversion rate of one or more landing pages, e.g., a landing page Version A and a landing page Version B.

The web server 402 can generate a markup language document representing a webpage including conditional content. The webpage can include at least two layouts, e.g., in a Version A the conditional content is displayed and in a Version B the conditional content is not displayed. Whether or not Version A or Version B is displayed can depend on the value of a variable included in, or referenced by, the markup language document.

The client browser 404 can request the webpage including the conditional content 410 from the web server. For example, a user of the client browser can browse to a URI of the webpage, which can generate a request for the webpage that can be sent to the web server 402.

The web server 402 can transmit the webpage including conditional content 412 to the client browser 404. In some implementations, the web server's 402 load balancing server can receive the request and forward it to one of the web server's 402 virtual data server. The web server's 402 virtual data server can transmit the webpage to the client browser 404.

The client browser 404 can determine if a condition to display conditional content is satisfied 414, and then can display the webpage with or without the conditional content 418. For example, the client browser 404 can generate a random integer number, and if the number is even, display the conditional content, which can cause the webpage to display in a first layout, i.e., Version A. If the number is odd, the client browser 404 can display the only the non-conditional content, which can cause the webpage to display in a second layout, i.e., Version B.

In another example, the client browser 404 can determine if a condition to display conditional content is satisfied 414 by sending a request to a remote server, e.g., a tracking server 406, to execute code to determine the variable value 416. In this example, the tracking server can record the state of previous similar requests, and evaluate the variable to an even or odd integer number, depending upon and opposite to a previous request. Thus, the tracking server can cause the webpage to be displayed in each of a first and second layout in nearly equal amounts for many such requests.

In yet another example, the client browser 404 can determine if a condition to display conditional content is satisfied 414 based on the orientation of the client browser 404. For example, some mobile electronic devices can alter their display orientation (e.g., between portrait and landscape) depending on the orientation of the mobile electronic device. In this example, the purpose of displaying the webpage with or without the conditional content 418 can be to show the webpage in an appropriate format for a particular orientation. In this implementation, the following steps relating to tracking conversion rates are not necessarily performed. The above examples for determining whether a condition is satisfied are illustrative only, and other examples are possible.

The client browser 404 can request from the web server 402 a conversion page 420. For example, a user can select a link displayed in the landing page, which can cause the client browser 404 to generate a request for a next webpage corresponding to the link, the next webpage being the conversion page.

The web server 402 can reply to the client browser 404 with a conversion page 422. In some implementations, the web server 402 can create a copy of the conversion page from data stored on a computer readable medium and transmit the copy to the client browser 404.

The client browser 404 can display the conversion page 424. In some implementations, the conversion page can include a JavaScript object that, when interpreted by the client browser 404, reports the display of the conversion page to the tracking server 406.

The tracking server 406 can track the conversion rate 426 of the particular version of landing page rendered in the client browser 404. In some implementations, the tracking server 406 can receive the report from the client browser 404 and additional similar reports from other browsers. The tracking server can record and aggregate these reports for the purpose of tracking the efficacy of the two layouts of the webpage (i.e., Versions A and B).

Figure 5:
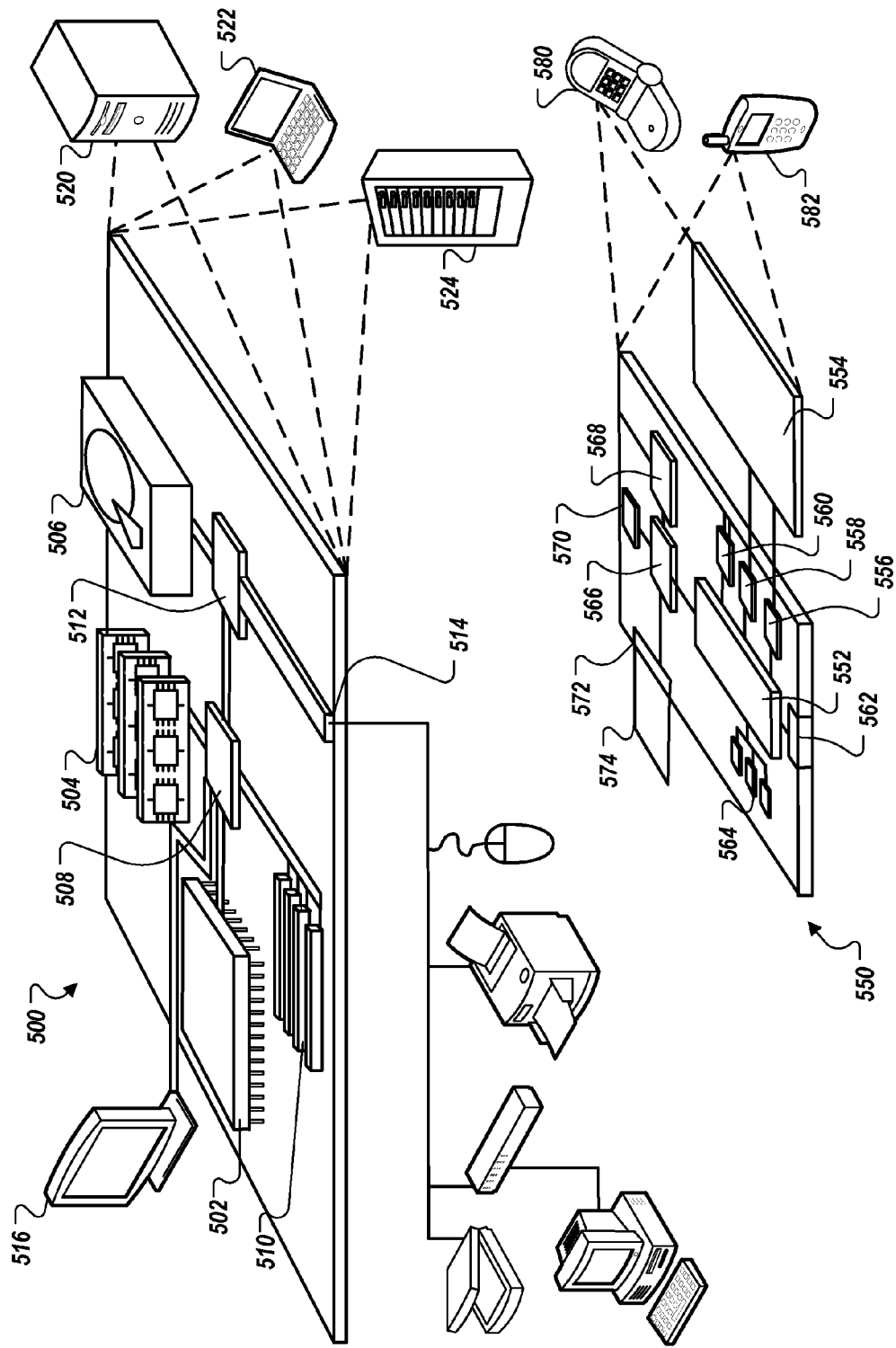
FIG. 5 shows examples of generic computer devices that can be used to execute the actions discussed in this document.

FIG. 5 shows an example of a generic computer device 500 and a generic mobile computer device 550, which can be used with the techniques described herein. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the subject matter described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various buses, and can be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses can be used, as appropriate, along with multiple memories and types of memory. Also, multiple computing devices 500 can be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 can also be another form of computer-readable medium, such as a magnetic or optical disk.

The storage device 506 is capable of providing mass storage for the computing device 500. In some implementations, the storage device 506 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also include instructions that, when executed, perform one or more methods, such as those described above. The information carrier can be a computer-readable or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which can accept various expansion cards (not shown). In the implementation, low-speed controller 512 is coupled to storage device 506 and low-speed expansion port 514. The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 500 can be implemented in a number of different forms, as shown in the figure. For example, it can be implemented as a standard server 520, or multiple times in a group of such servers. It can also be implemented as part of a rack server system 524. In addition, it can be implemented in a personal computer such as a laptop computer 522. Alternatively, components from computing device 500 can be combined with other components in a mobile device (not shown), such as device 550. Each of such devices can include one or more of computing device 500, 550, and an entire system can be made up of multiple computing devices 500, 550 communicating with each other.

Computing device 550 includes a processor 552, memory 564, an input/output device, such as a display 554, a communication interface 566, and a transceiver 568, among other components. The device 550 can also be provided with a storage device, such as a microdrive or other device, to provide additional storage. Each of the components 550, 552, 564, 554, 566, and 568, are interconnected using various buses, and several of the components can be mounted on a common motherboard or in other manners as appropriate.

The processor 552 can execute instructions within the computing device 550, including instructions stored in the memory 564. The processor can be implemented as a chipset of chips that include separate and multiple analog and digital processors. The processor can provide, for example, for coordination of the other components of the device 550, such as control of user interfaces, applications run by device 550, and wireless communication by device 550.

Processor 552 can communicate with a user through control interface 558 and display interface 556 coupled to a display 554. The display 554 can be, for example, a TFT LCD (Thin-Film-Transistor Liquid Crystal Display) or an OLED (Organic Light Emitting Diode) display, or other appropriate display technology. The display interface 556 can comprise appropriate circuitry for driving the display 554 to present graphical and other information to a user. The control interface 558 can receive commands from a user and convert them for submission to the processor 552. In addition, an external interface 562 can be provide in communication with processor 552, so as to enable near area communication of device 550 with other devices. External interface 562 can provide, for example, for wired communication in some implementations, or for wireless communication in other implementations, and multiple interfaces can also be used.

The memory 564 stores information within the computing device 550. The memory 564 can be implemented as one or more of a computer-readable medium or media, a volatile memory unit or units, or a non-volatile memory unit or units. Expansion memory 574 can also be provided and connected to device 550 through expansion interface 572, which can include, for instance, a SIMM (Single In Line Memory Module) card interface. Such expansion memory 574 can provide extra storage space for device 550, or can also store applications or other information for device 550. Specifically, expansion memory 574 can include instructions to carry out or supplement the processes described above, and can include secure information also. Thus, for example, expansion memory 574 can be provided as a security module for device 550, and can be programmed with instructions that permit secure use of device 550. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer-readable or machine-readable medium, such as the memory 564, expansion memory 574, memory on processor 552, or a propagated signal that can be received, for example, over transceiver 568 or external interface 562.

Device 550 can communicate wirelessly through communication interface 566, which can include digital signal processing circuitry where necessary. Communication interface 566 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 568. In addition, short-range communication can occur, such as using a Bluetooth, WiFi, or other such transceiver (not shown). In addition, GPS (Global Positioning System) receiver module 570 can provide additional navigation-related and location-related wireless data to device 550, which can be used as appropriate by applications running on device 550.

Device 550 can also communicate audibly using audio codec 560, which can receive spoken information from a user and convert it to usable digital information. Audio codec 560 can likewise generate audible sound for a user, such as through a speaker, e.g., in a handset of device 550. Such sound can include sound from voice telephone calls, can include recorded sound (e.g., voice messages, music files, etc.) and can also include sound generated by applications operating on device 550.

The computing device 550 can be implemented in a number of different forms, as shown in the figure. For example, it can be implemented as a cellular telephone 580. It can also be implemented as part of a smartphone 582, personal digital assistant, or other similar mobile device.

Device 550 can also include one or more different devices that are capable of sensing motion. Examples include, but are not limited to, accelerometers and compasses. Accelerometers and compasses, or other devices that are capable of detecting motion or position are available from any number of vendors and can sense motion in a variety of ways. For example, accelerometers can detect changes in acceleration while compasses can detect changes in orientation respective to the magnetic North or South Pole. These changes in motion can be detected by the device 550 and used to update the display of the respective devices 550 according to processes and techniques described herein.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the invention.

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computer-implemented method comprising:
receiving, by a client computing device and as having been sent from a server system, a markup language document for a webpage that includes JavaScript code, a comment tag, a variable, and an attribute that is separate from the variable and that is associated with a second markup language tag other than the comment tag, the comment tag being separate from the JavaScript code and arranged to indicate particular content in the markup language document that is not to be processed by the client computing device for display when the comment tag is interpreted as a comment tag by the client computing device;
determining that the variable holds a first value;
in response to determining that the variable holds the first value, rendering a first version of the webpage that includes a representation of the particular content for display, wherein the rendering includes using the JavaScript code to write the second markup language tag in the markup language document such that the characters that form the comment tag are set as a value of the attribute and the comment tag is ignored as a comment tag as a result of the client computing device interpreting the characters that form the comment tag as the value of the attribute; and
providing, to the server system for monitoring a conversion rate of the webpage, first conversion data that indicates that the first version of the webpage has been rendered, wherein the markup language document is structured to cause the client computing device, in response to the variable holding a second value that is different from the first value, (i) to render a second version of the webpage that does not include the representation of the particular content for display, the comment tag being arranged for interpretation as a comment tag in the second version of the webpage, and (ii) to provide, to the server system for monitoring the conversion rate of the webpage, second conversion data that indicates that the second version of the webpage has been rendered.

2. The method of claim 1, wherein the JavaScript code defines the variable to hold the value.

3. The method of claim 1, wherein:
when the variable is the first value, ignoring at the comment tag as a comment tag comprises disregarding the comment tag even though the comment tag remains present in the markup language document.

4. The method of claim 1, wherein:
the particular content in the markup language document that is indicated by the comment tag includes conditional content that is conditionally displayed in a webpage represented by the markup language document depending on the value of the variable, where the conditional content is displayed if the variable holds the first value.

5. The method of claim 4, wherein if the JavaScript code is not executed by the client computing device, then the conditional content is not displayed in the webpage as a result of the JavaScript code not being executed by the client computing device.

6. The method of claim 1, wherein the markup language document further includes code that is operable to determine the value of the variable.

7. The method of claim 6, wherein the code that is operable to determine the value of the variable bases the determination on a setting of the client computing device.

8. The method of claim 6, wherein the code operable to determine the value of the variable comprises a random number generator.

9. The method of claim 6, wherein the code operable to determine the value of the variable includes a call to a universal resource identifier from which a value can be returned assigning a value to the variable.

10. The method of claim 6, wherein the code operable to determine the value of the variable includes a call to a universal resource identifier from which a function can be returned that can be executed to determine the value to the variable.

11. A non-transitory computer-readable storage device encoded with a computer program product, the computer program product including instructions that, when executed, perform operations comprising:
generating, by a server system, a markup language document for a webpage, the markup language document comprising JavaScript code, a comment tag, a variable, and an attribute that is separate from the variable and that is associated with a second markup language tag other than the comment tag, the comment tag being separate from the JavaScript code and arranged to indicate particular content in the markup language document that is not to be processed for display when the comment tag is interpreted as a comment tag by a first computing device that is caused to execute the markup language document;
wherein the markup language document is structured to cause the first computing device, when the markup language document is executed by the first computing device and in response to the variable being determined to hold a first value, (i) to render a first version of the webpage, wherein the rendering includes using the JavaScript code to write the second markup language tag in the markup language document such that the characters that form the comment tag are set as a value of the attribute and the comment tag is ignored as a comment tag as a result of the first computing device being caused to interpret the characters that form the comment tag as the value of the attribute, and (ii) to provide, to the server system for monitoring a conversion rate of the webpage, first conversion data that indicates that the first version of the webpage has been rendered, and
wherein the markup language document is further structured to cause the first computing device, when the markup language document is executed by the first computing device and in response to the variable being determined to hold a second value that is different from the first value, (i) to render a second version of the webpage, wherein the rendering includes interpreting the comment tag normally such that the particular content in the markup language document indicated by the comment tag is not processed by the first computing device for display, and (ii) to provide, to the server system for monitoring a conversion rate of the webpage, second conversion data that indicates that the second version of the webpage has been rendered; and
transmitting the markup language document to the first computing device.

12. The non-transitory computer-readable storage device of claim 11, wherein the JavaScript code defines the variable to hold the value.

13. The non-transitory computer-readable storage device of claim 11, wherein:
as a result of the variable being determined to hold the first value, ignoring the comment tag as a comment tag comprises disregarding the comment tag even though the comment tag remains present in the markup language document.

14. The non-transitory computer-readable storage device of claim 11, wherein:
the particular content in the markup language document that is indicated by the comment tag includes conditional content that is conditionally displayed in a webpage represented by the markup language document depending on the value of the variable, where the conditional content is displayed if the variable holds the first value.

15. The non-transitory computer-readable storage device of claim 11, wherein if the JavaScript code is not executed by the first computing device, then the conditional content is not displayed in the webpage as a result of the first computing device not executing the JavaScript code.

16. The non-transitory computer-readable storage device of claim 11, wherein the markup language document further comprises code operable to determine the value of the variable.

17. A system comprising:
a processor;
a storage device coupled to the processor and configurable for storing instructions, which, when executed by the processor cause the processor to perform operations comprising:
generating, by the system, a markup language document for a webpage, the markup language document comprising JavaScript code, a comment tag, a variable, and an attribute that is separate from the variable and that is associated with a second markup language tag other than the comment tag, the comment tag being separate from the JavaScript code and arranged to indicate particular content in the markup language document that is not to be processed for display when the comment tag is interpreted as a comment tag by a first computing device that is caused to execute the markup language document;
wherein the markup language document is structured to cause the first computing device, when the markup language document is executed by the first computing device and in response to the variable being determined to hold a first value, (i) to render a first version of the webpage, wherein the rendering includes using the JavaScript code to write the second markup language tag in the markup language document such that the characters that form the comment tag are set as a value of the attribute and the comment tag is ignored as a comment tag as a result of the first computing device being caused to interpret the characters that form the comment tag as the value of the attribute, and (ii) to provide, to the system for monitoring a conversion rate of the webpage, first conversion data that indicates that the first version of the webpage has been rendered, and wherein the markup language document is further structured to cause the first computing device, when the markup language document is executed by the first computing device and in response to the variable being determined to hold a second value that is different from the first value, (i) to render a second version of the webpage, wherein the rendering includes interpreting the comment tag normally such that the particular content in the markup language document indicated by the comment tag is not processed by the first computing device for display, and (ii) to provide, to the system for monitoring a conversion rate of the webpage, second conversion data that indicates that the second version of the webpage has been rendered; and transmitting the markup language document to the first computing device.

18. The system of claim 17, wherein the JavaScript code defines the variable to hold the value.

19. The system of claim 17, wherein:
as a result of the variable being determined to hold the first value, ignoring the comment tag as a comment tag comprises disregarding the comment tag even though the comment tag remains present in the markup language document.

20. The system of claim 17, where:
the particular content in the markup language document that is indicated by the comment tag includes conditional content that is conditionally displayed in a webpage represented by the markup language document depending on the value of the variable, where the conditional content is displayed if the variable holds the first value.

21. The system of claim 17, wherein if the JavaScript code is not executed by the first computing device, then the conditional content is not displayed in the webpage as a result of the first computing device not executing the JavaScript code.

22. The system of claim 17, wherein the markup language document further comprises code operable to determine the value of the variable.

23. One or more non-transitory computer-readable devices including instructions that, when executed by one or more processors, cause performance of operations, the operations comprising:
receiving, by a client computing device and as having been sent from a server system, a markup language document for a webpage that includes JavaScript code, a comment tag, a variable, and an attribute that is separate from the variable and that is associated with a second markup language tag other than the comment tag, the comment tag being separate from the JavaScript code and arranged to indicate particular content in the markup language document that is not to be processed by the client computing device for display when the comment tag is interpreted as a comment tag by the client computing device;
determining that the variable holds a first value;
in response to determining that the variable holds the first value, rendering a first version of the webpage that includes a representation of the particular content for display, wherein the rendering includes using the JavaScript code to write the second markup language tag in the markup language document such that the characters that form the comment tag are set as a value of the attribute and the comment tag is ignored as a comment tag as a result of the client computing device interpreting the characters that form the comment tag as the value of the attribute; and
providing, to the server system for monitoring a conversion rate of the webpage, first conversion data that indicates that the first version of the webpage has been rendered,
wherein the markup language document is structured to cause the client computing device, in response to the variable holding a second value that is different from the first value, (i) to render a second version of the webpage that does not include the representation of the particular content for display, the comment tag being arranged for interpretation as a comment tag in the second version of the webpage, and (ii) to provide, to the server system for monitoring the conversion rate of the webpage, second conversion data that indicates that the second version of the webpage has been rendered.

24. The one or more non-transitory computer-readable devices of claim 23, wherein the JavaScript code defines the variable to hold the value.

25. The one or more non-transitory computer-readable devices of claim 23, wherein, as a result of the variable holding the first value, ignoring at the comment tag as a comment tag comprises disregarding the comment tag even though the comment tag remains present in the markup language document.

26. The one or more non-transitory computer-readable devices of claim 23, wherein the markup language document further comprises code that is operable to determine the value of the variable.

* * * * *

UNITED STATES PATENT AND TRADEMARK OFFICE
CERTIFICATE OF CORRECTION

PATENT NO.       : 8,689,117 B1                                              Page 1 of 1
APPLICATION NO.  : 12/610242
DATED            : April 1, 2014
INVENTOR(S)      : Vasilik et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 191 days.

Signed and Sealed this
Thirtieth Day of May, 2017

Michelle K. Lee
*Director of the United States Patent and Trademark Office*